(12) United States Patent  
Alcaniz et al.

(10) Patent No.: US 11,420,193 B2  
(45) Date of Patent: Aug. 23, 2022

(54) HYDROTREATING CATALYST WITH A TITANIUM CONTAINING CARRIER AND ORGANIC ADDITIVE

(71) Applicant: Albemarle Europe SRL, Louvain-la-Neuve (BE)

(72) Inventors: Jana Juan Alcaniz, Amsterdam (NL); Jacob Arie Bergwerff, Amsterdam (NL); Kar Ming Au Yeung, Amsterdam (NL); Wilhelmus Clemens Jozef Veerman, Volendam (NL)

(73) Assignee: Albemarle Europe SRL, Louvain-la-Neuve (BE)

(*) Notice: Subject to any disclaimer, the term of this patent is extended or adjusted under 35 U.S.C. 154(b) by 0 days.

(21) Appl. No.: 16/631,932

(22) PCT Filed: Jul. 20, 2018

(86) PCT No.: PCT/EP2018/069769  
§ 371 (c)(1),  
(2) Date: Jan. 17, 2020

(87) PCT Pub. No.: WO2019/016372  
PCT Pub. Date: Jan. 24, 2019

(65) Prior Publication Data  
US 2020/0222887 A1 Jul. 16, 2020

Related U.S. Application Data

(60) Provisional application No. 62/535,626, filed on Jul. 21, 2017.

(51) Int. Cl.  
*B01J 31/38* (2006.01)  
*B01J 21/06* (2006.01)  
(Continued)

(52) U.S. Cl.  
CPC ............ *B01J 31/38* (2013.01); *B01J 21/063* (2013.01); *B01J 23/882* (2013.01); *B01J 23/883* (2013.01);  
(Continued)

(58) Field of Classification Search  
CPC ...... B01J 21/063; B01J 23/882; B01J 23/883; B01J 23/888; B01J 23/85; B01J 31/38;  
(Continued)

(56) References Cited

U.S. PATENT DOCUMENTS 4,028,227 A 6/1977 Gustafson  
4,465,790 A 8/1984 Quayle  
(Continued)

FOREIGN PATENT DOCUMENTS

CN 101722006 A 6/2010  
CN 104588031 5/2015  
(Continued)

OTHER PUBLICATIONS

International Search Report and Written Opinion for Application No. PCT/EP2019/069769 dated Jan. 24, 2019.  
(Continued)

*Primary Examiner* — Brian A McCaig  
(74) *Attorney, Agent, or Firm* — Nathaniel C. Dunn; Troy S. Kleckley

(57) ABSTRACT

Disclosed is a catalyst for use in hydrotreating hydrocarbon feedstocks and methods of making the same catalyst. Specifically, a catalyst is disclosed comprises at least one Group VIB metal component, at least one Group VIII metal component, an organic additive resulting in a C-content of the final catalysts of about 1 to about 30 wt % C, and preferably about 1 to about 20 wt % C, and more preferably about 5 to about 15 wt % C and a titanium-containing carrier component, wherein the amount of the titanium component is in the  
(Continued)

range of about 3 to about 60 wt %, expressed as an oxide ($TiO_2$) and based on the total weight of the catalyst. The titanium-containing carrier is formed by co-extruding or precipitating a titanium source with a $Al_2O_3$ precursor to form a porous support material primarily comprising $Al_2O_3$ or by impregnating a titanium source onto a porous support material primarily comprising $Al_2O_3$. Special preference is given to alumina and alumina containing up to and no more than 1 wt % of silica, preferably no more than 0.5 wt % based on the total weight of the support (dry base).

5 Claims, 1 Drawing Sheet

(51) Int. Cl.

| | | |
|---|---|---|
| *B01J 23/882* | (2006.01) | |
| *B01J 23/883* | (2006.01) | |
| *B01J 27/19* | (2006.01) | |
| *B01J 31/02* | (2006.01) | |
| *B01J 31/04* | (2006.01) | |
| *B01J 37/00* | (2006.01) | |
| *B01J 37/02* | (2006.01) | |
| *B01J 37/03* | (2006.01) | |
| *B01J 37/08* | (2006.01) | |
| *C10G 45/08* | (2006.01) | |

(52) U.S. Cl.
CPC ........... *B01J 27/19* (2013.01); *B01J 31/0202* (2013.01); *B01J 31/0204* (2013.01); *B01J 31/04* (2013.01); *B01J 37/0009* (2013.01); *B01J 37/0203* (2013.01); *B01J 37/024* (2013.01); *B01J 37/0205* (2013.01); *B01J 37/0207* (2013.01); *B01J 37/0213* (2013.01); *B01J 37/031* (2013.01); *B01J 37/082* (2013.01); *C10G 45/08* (2013.01)

(58) Field of Classification Search
CPC .... B01J 31/0202; B01J 31/0204; B01J 31/04; B01J 37/0009; B01J 37/0203; B01J 37/0205; B01J 37/0207; B01J 37/0213; B01J 37/024; B01J 37/031; B01J 37/082; B01J 37/0244; B01J 27/19; C10G 45/04; C10G 45/06; C10G 45/08
See application file for complete search history.

(56) References Cited

U.S. PATENT DOCUMENTS

| | | | |
|---|---|---|---|
| 4,992,403 A | * | 2/1991 | Takahashi ............... B01J 37/20 502/162 |
| 4,997,801 A | | 3/1991 | Mitarai et al. |
| 6,090,745 A | | 7/2000 | DuBois et al. |
| 6,267,874 B1 | | 7/2001 | Iijima et al. |
| 6,280,610 B1 | | 8/2001 | Uragami et al. |
| 6,383,975 B1 | | 5/2002 | Rocha et al. |
| 7,169,294 B2 | | 1/2007 | Abe et al. |
| 9,061,265 B2 | | 6/2015 | Seki et al. |
| 9,067,191 B2 | | 6/2015 | Seki et al. |
| 9,463,452 B2 | | 10/2016 | Inoue et al. |
| 9,776,180 B2 | | 10/2017 | Inoue et al. |
| 10,071,370 B2 | | 9/2018 | Inoue et al. |
| 2001/0046939 A1 | | 11/2001 | Eijsbouts |
| 2007/0135300 A1 | * | 6/2007 | Kagami ................... B01J 23/85 502/208 |
| 2008/0132407 A1 | | 6/2008 | Bai et al. |
| 2009/0261019 A1 | | 10/2009 | McCarthy et al. |
| 2012/0168347 A1 | | 5/2012 | Eijsbouts-Spickova et al. |
| 2013/0153467 A1 | | 6/2013 | Seki et al. |

FOREIGN PATENT DOCUMENTS

| | | |
|---|---|---|
| CN | 103721693 B | 3/2016 |
| FR | 2791277 B1 | 4/2001 |
| JP | 2817622 B2 | 10/1998 |
| JP | 2005262173 A | 9/2005 |
| RU | 2242283 C2 | 12/2004 |
| RU | 2343974 C2 | 1/2009 |
| RU | 2352394 C1 | 4/2009 |
| RU | 2387480 C2 | 4/2010 |
| RU | 2474474 C1 | 2/2013 |
| WO | 1996/41848 | 12/1997 |
| WO | 2001/076738 | 10/2001 |
| WO | 2001/076741 | 10/2001 |
| WO | 2008/045550 | 4/2008 |
| WO | 2011/023668 | 5/2011 |
| WO | 2016/170188 | 10/2016 |

OTHER PUBLICATIONS

Russian Office Action re Application No. 2020107708 dated Oct. 20, 2021.

* cited by examiner

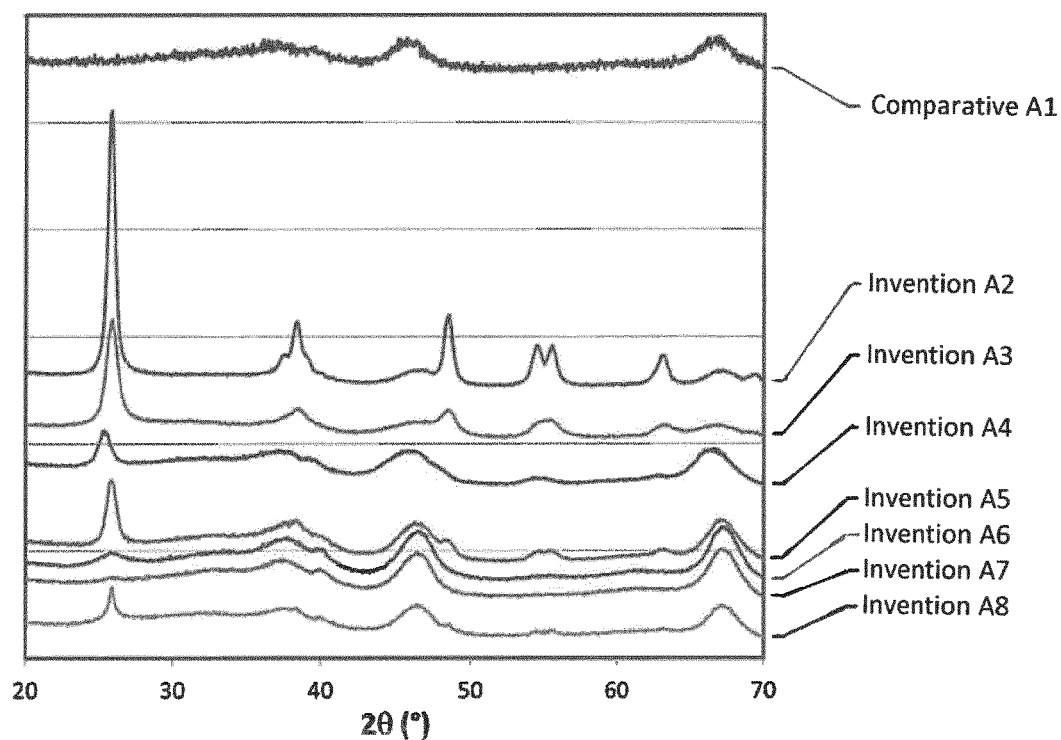

HYDROTREATING CATALYST WITH A TITANIUM CONTAINING CARRIER AND ORGANIC ADDITIVE

TECHNICAL FIELD

The present invention is in the field of catalysts useful for hydrotreating hydrocarbon feedstocks in refining processes.

THE INVENTION

In general, hydrotreating catalysts are composed of a carrier having deposited thereon a Group VIB (of the Periodic Table) metal component and a Group VIII (of the Periodic Table) metal component. The most commonly employed Group VIB metals are molybdenum and tungsten, while cobalt and nickel are the conventional Group VIII metals. Phosphorus may also be present in the catalyst. The prior art processes for preparing these catalysts are characterized in that a carrier material is composited with hydrogenation or hydrotreating metal components, for example by impregnation, after which the composite is generally calcined to convert the metal components into their oxides. Before being used in hydrotreating, the catalysts are generally sulfided to convert the hydrogenation metals into their sulfides. Processes for activating and regenerating such catalysts are also known.

The use of $TiO_2$-containing carriers in hydroprocessing catalysts, which are generally calcined after application of the active metals, is widely known. The inclusion of $TiO_2$ in the hydroprocessing carriers has commonly been reported to show higher desulfurization activity, but the fundamentals behind such behavior are not well understood. For example, US Patent Publications US20120181219 and US20130153467 disclose a metal component selected from Groups VIA and VIII in the periodic table, supported on a silica-titania-alumina support where the total of the diffraction peak area indicating the crystal structure of anatase titania (101) planes and the diffraction peak area indicating the crystal structure of rutile titania (110) planes is ¼ or less of the diffraction peak area indicating the aluminum crystal structure ascribed to γ-alumina (400) planes, as measured by X-ray diffraction analysis. However, these references fail to disclose the combination of the present invention, (i.e. the combination of a $TiO_2$ containing support and the use of an organic additive) and require the addition of silica in the carrier.

Another example is U.S. Pat. No. 6,383,975 which discloses a catalyst that uses a support consisting on an alumina matrix, having dispersed on its surface or in its mass, or in both, a metal oxide from group IVB of the periodic table. The support is prepared by co-precipitation technique, co-gelification or impregnation of the alumina with a Ti compound, soluble in an organic solvent, followed by drying at 100 to 200° C. and calcination at 400 to 600° C., on oxidizing atmosphere. However, this reference also fails to disclose the combination of the present invention as it does not disclose the synergistic effect of titanium and organic additives Another example is U.S. Pat. No. 9,463,452 which discloses a catalyst that uses a titania coated alumina particles shaped into extrudates. The hydrotreating catalyst then supports a periodic table group 6 metal compound, a periodic table group 8-10 metal compound, a phosphorus compound, and a saccharide. The invention of the '452 patent is limited to a very specific manufacturing process and only to the use of saccharides as potential additives.

It was found that by using $TiO_2$-containing carriers in combination with the use of certain organics in the preparation method, highly active hydrotreating catalysts can be made. The activity of these catalysts is higher than (i) what can be achieved on a conventional $Al_2O_3$ support with the same organic or (ii) when the $TiO_2$-containing catalysts are being prepared without organics. Moreover, it appears the activity of the active phase in the catalyst prepared with $TiO_2$-containing supports in combination with organics is higher than can be expected based on the effect of the individual contributions of these parameters. This higher active phase activity can be applied to generate hydrotreating catalysts with a superior volumetric activity or catalysts with high activity at considerably lower concentrations of the active Group VIB and Group VIII metal components.

Thus, in one embodiment of the invention there is provided a catalyst comprising at least one Group VIB metal component, at least one Group VIII metal component, an organic additive resulting in a C-content of the final catalysts of about 1 to about 30 wt % C, and preferably about 1 to about 20 wt % C, and more preferably about 5 to about 15 wt % C and a titanium-containing carrier component, wherein the amount of the titanium component is in the range of about 3 to about 60 wt %, expressed as an oxide ($TiO_2$) and based on the total weight of the catalyst. The titanium-containing carrier is formed by co-extruding or precipitating a titanium source with a $Al_2O_3$ precursor to form a porous support material primarily comprising $Al_2O_3$ or by impregnating a titanium source onto a porous support material primarily comprising $Al_2O_3$.

In another embodiment of the invention, provided is a method of producing a catalyst. The method comprises the preparation of a Ti-containing porous support material primarily comprising $Al_2O_3$. This can be achieved by co-extruding or precipitating a titanium source with a $Al_2O_3$ precursor, shaping to form carrier extrudates, followed by drying and calcination. Alternatively, porous $Al_2O_3$ extrudates may be impregnated with a Ti-source followed by drying and calcination. The Ti-containing porous support is impregnated with a solution comprised of at least one Group VIB metal source and/or at least one Group VIII metal source. An organic additive is added in the production process either by co-impregnation with the metal sources or via a post-impregnation. In the process, the amount of the titanium source is sufficient so as to form a catalyst composition at least having a titanium content in the range of about 3 wt % to about 60 wt %, expressed as an oxide ($TiO_2$) and based on the total weight of the catalyst after calcination.

In another embodiment of the invention, there is provided a catalyst composition formed by the just above-described process. Another embodiment of the invention is a hydrotreating process carried out employing the catalyst composition.

These and still other embodiments, advantages and features of the present invention shall become further apparent from the following detailed description, including the appended claims.

DETAILED DESCRIPTION OF THE DRAWINGS

FIG. 1 details the XRD patterns of the catalysts of the present invention and comparative.

Further Detailed Description of the Invention

Unless otherwise indicated, weight percent (_wt. %) as used herein is the weight percent of the specified form of the substance, based upon the total weight of the product for which the specified substance or form of substance is a constituent or component. The weight percent of $TiO_2$ and Group VIB and Group VIII metals-oxides are based on the total weight of the final catalyst after calcination, i.e. excluding the presence of organics and/or water. The weight percent of organics in the final catalyst is based on the total weight of the final catalyst without calcination. It should further be understood that, when describing steps or components or elements as being preferred in some manner herein, they are preferred as of the initial date of this disclosure, and that such preference(s) could of course vary depending upon a given circumstance or future development in the art.

The Group VIB metal component in catalysts of the invention is selected from the group consisting of molybdenum, tungsten, chromium and a mixture of two or more of the foregoing, while molybdenum and/or tungsten is typically preferred, and molybdenum is typically more preferred. The Group VIII metal component is selected from group consisting of iron, cobalt and nickel, while nickel and/or cobalt are typically preferred. Preferred mixtures of metals include a combination of (a) nickel and/or cobalt and (b) molybdenum and/or tungsten. When hydrodesulfurization (sometimes hereafter referred to as "HDS") activity of the catalyst is important, a combination of cobalt and molybdenum is advantageous and typically preferred. When hydrodenitrogenation (sometimes hereafter referred to as "HDN") activity of the catalyst is important, a combination of nickel and either molybdenum or tungsten is advantageous and typically preferred.

The Group VIB metal component can be introduced as an oxide, an oxo acid, or an ammonium salt of an oxo or polyoxo anion. The Group VIB metal compounds are formally in the +6 oxidation state. Oxides and oxo acids are preferred Group VIB metal compounds. Suitable Group VIB metal compounds in the practice of this invention include chromium trioxide, chromic acid, ammonium chromate, ammonium dichromate, molybdenum trioxide, molybdic acid, ammonium molybdate, ammonium para-molybdate, tungsten trioxide, tungstic acid, ammonium tungsten oxide, ammonium metatungstate hydrate, ammonium para-tungstate, and the like. Preferred Group VIB metal compounds include molybdenum trioxide, molybdic acid, tungstic acid and tungsten trioxide. Mixtures of any two or more Group VIB metal compounds can be used; a mixture of products will be obtained when compounds having different Group VIB metal are used. The amount of Group VIB metal compound employed in the catalyst will typically be in the range of about 15 to about 30 wt % (as trioxide), based on the total weight of the catalyst.

The Group VIII metal component is usually introduced as an oxide, hydroxide or salt. Suitable Group VIII metal compounds include, but are not limited to, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include cobalt carbonate, cobalt hydroxy-carbonate, cobalt hydroxide, nickel hydroxy-carbonate nickel carbonate and nickel hydroxide. Mixtures of two or more Group VIII metal compounds can be used; when the Group VIII metals of the compounds in the mixture are different, a mixture of products will be obtained. The amount of Group VIII metal compound employed in the catalyst will typically be in the range of about 2 to about 8 wt % (as oxide), based on the total weight of the catalyst. In a preferred embodiment of this invention, the amount of Group VIII metal compound is in the range of about 2 to about 6 wt % (as oxide), based on the total weight of the catalyst.

The titanium component will typically be introduced as titania, titanyl sulfate, titanium sulfate, Titanium(IV)bis(ammonium lactato)dihydroxide, titanium alkoxide (like Ti-isopropoxide, Ti-butoxide, Ti-ethoxide, etc.), or $TiCl_4$. The amount of the titanium component in the catalyst will typically be in the range of about 3 to about 60 wt %, expressed as an oxide ($TiO_2$) and based on the total weight of the catalyst. In a preferred embodiment of this invention, the amount of titanium component is in the range of about 5 wt % to about wt %, expressed as an oxide ($TiO_2$) and based on the total weight of the catalyst.

The catalyst carrier may further comprise alumina in any of the known forms, such as gamma-alumina, eta-alumina or alpha alumina. Silica is often applied in small amounts to serve as in the precipitation of the alumina precursor. This component may therefore be present in the final catalysts of the invention. Special preference is given to alumina and alumina containing up to and no more than 1 wt % of silica, preferably no more than 0.5 wt % based on the total weight of the catalyst.

The physical properties of the final carrier are not critical to the process according to the invention, since the synergistic effect between the use of titania containing carriers and organics should be always observed. However, it is known that there is a specific range of pore size, surface area and pore volume that performs better depending on the hydroprocessing application. All physical properties are measured via nitrogen physisorption techniques (Quadrasorb equipment and 300° C. pretreatment overnight under vacuum).

The carrier's pore volume (measured at 100 nm assuming de Boer and Kelvin equations to convert relative pressure into pore diameter), will generally be in the range of 0.2 to 2 ml/g, preferably 0.4 to 1 ml/g. The carrier specific surface area will generally be in the range of 50 to 400 $m^2/g$ (measured using the BET method). Preferably, the carrier will have a median pore diameter in the range of 5 to 15 nm.

The catalyst is employed in the conventional manner in the form of, for example, spheres or extrudates. Examples of suitable types of extrudates have been disclosed in the literature (see, e.g. U.S. Pat. No. 4,028,227).

The titanium compound can be incorporated into the carrier by impregnation, co-extrusion or precipitation, atomic layer deposition (ALD), or chemical vapor deposition (CVD). It is preferred that the titanium component is precipitated with the other components of the carrier, as it is believed, without being bound to theory, that precipitation results in a better dispersion of the titanium component employed in the highly active catalyst of this invention than what can be achieved via co-extrusion. Furthermore, the addition of the titanium component in this step prevents the need for an additional production step, as is the case when impregnation, ALD or CVD are used.

When adding the titanium via co-precipitation, known methods of co-precipitation can be used. In particular, Aluminum sulfate (Alum) and Titanyl sulfate ($TiOSO_4$) or titanium sulfate can be mixed in one stream and sodium aluminate (Natal) are dosed either simultaneously or subsequently to a heel of water at elevated T and a pH>7. The compositions and flow rates of Natal and Alum/$TiOSO_4$/titanium sulfate can be adjusted to achieve the desired final $TiO_2$ content in the thus created $TiO_2/Al_2O_3$ material. The pH can be controlled constantly with NaOH or $H_2SO_4$. Total dosing time can be varied between minutes and 2 hours and the final solid concentration in the reactor will be approximately 2-10% on weight basis. In a subsequent step, the pH can be raised with NaOH or Natal to 9-12 to age. The slurry is then filtered and washed. The thus obtained solid can then be shaped into support bodies via extrusion, pelletizing or pressing which can be preceded by drying, spray-drying, milling, kneading and other methods known in the art to arrive at an extrudable material.

Strike-precipitation is very similar to co-precipitation processes, but the acidic stream is added to the basic components dispersed in the reactor vessel. Natal is diluted in water and under vigorous stirring waterglass is added while heating at 60° C. To this mixture aluminum sulfate and titanyl sulfate are added in 20 min with a final pH of 6.5. pH is not controlled during the addition and only allow to settle with the complete dossing of both streams. NaOH is used to adjust the pH to 7.2 and the mixture is aged for 1 hour at 60° C. while stirring. The cake is re-slurried with water, brought to pH 10 with ammonia and aged at 95° C. for 1 hour while stirring. Then, the slurry is filtered and washed with water to remove excess ammonia. The obtained solid can then be shaped into support bodies via extrusion, pelletizing or pressing which can be preceded by drying, spray-drying, milling, kneading and other methods known in the art to arrive at an extrudable material.

Step-precipitation can be carried out by reaction or precipitation of a Ti-precursor such as titanyl sulfate on a slurry of boehmite or pseudo-boehmite in water. Firstly alumina is precipitated via simultaneous dosing of sodium aluminate (Natal) and aluminum sulfate (Alum) to a heel of water at elevated T and a pH>7. The flows of Natal and Alum can be adjusted and the pH is controlled with NaOH or $H_2SO_4$. After aging at pH 9-12, filtration and washing, the thus-formed boehmite or pseudo-boehmite filter cake can be re-slurried in water. To this slurry $TiOSO_4$ or titanium sulfate can be added either simultaneously or subsequently with NaOH at elevated T and pH>7 in about 10 minutes to 1 hour. The slurry is then filtered and washed. The thus-obtained solid can then be shaped into support bodies via extrusion pelletizing or pressing, which can be preceded by drying, spray-drying, milling, kneading and other methods known in the art to arrive at an extrudable material.

Co-extrusion is carried out by adding the titanium component to an alumina precursor component during a kneading or mixing step. The moment of addition is not fixed. The titanium component is added as a solid or as a solution of molecular Ti-compounds. During the kneading or mixing step, the mix is heated to a desired temperature to remove any excess of solvent/water if needed. Kneading or mixing is finished when the desired moisture content (as determined by Loss on Ignition at a temperature in the range of 500-600° C.) is reached. Next, the mix is shaped to extrudates by using a suitable shaping technique. Besides extrusion, shaping can be accomplished via pelletizing or pressing.

The support bodies formed via precipitation and co-extrusion methods are then dried at a temperature in the range of 80-200° C. to remove a substantial amount of solvent/water and then calcined under air or inert conditions with or without steam at a temperature in the range of 400-900° C., resulting in the case of alumina, in a carrier containing a transition alumina e.g., a gamma, theta or eta-alumina. The titania component will also be present as an oxide, such as anatase or rutile. The calcination can be in a static or rotating mode.

When adding the titanium via impregnation, the titanium precursor is applied to a porous carrier, primarily comprising $Al_2O_3$. Known methods of impregnation can be used. In particular, pore volume impregnation is preferred. A solution of aqueous titania precursor, such as titanyl sulfate, titanium sulfate or Titanium(IV)bis(ammonium lactato)dihydroxide is prepared. Alternatively, a non-aqueous solution of an alkoxide titantia can be prepared. Then, the alumina extrudate is coated/impregnated with the titanium solution. The impregnated carrier so formed is then dried at a temperature in the range of 80-200° C. to remove a substantial amount of solvent/water and then generally calcined under air or inert conditions with or without steam at a temperature in the range of 400-700° C.

In preparation of the $TiO_2$ containing support material it may be advantageous that part of the $TiO_2$ is introduced in one step, while another part of the $TiO_2$ is introduced in another step.

The calcined extrudates primarily comprising $Al_2O_3$ and $TiO_2$ are then impregnated with a solution comprising a Group VIB metal source and/or a Group VIII metal source and optionally a phosphorous source. Impregnation is carried out by pore volume impregnation with an impregnation solution that can also comprise the selected organic additives in an appropriate solvent. The solvent used in preparing the additive impregnation solution is generally water, although other components such as methanol, ethanol and other alcohols may also be suitable. Impregnation can be carried out at room temperature or at elevated temperatures, but will typically be carried out at about 20-100° C. Instead of impregnating techniques, dipping methods, spraying methods, etc. can be used. After impregnation, an optional drying step is carried out with the objective to remove water, but leave (the largest part) of the organic additive on the catalyst. Drying is typically carried out at a temperature in the range of 25-220° C. In case the organics are not added in the impregnation solution containing the metal-precursors, a subsequent impregnation step is carried out.

The final catalyst further comprises an organic additive. This organic additive can be added together with the Group VIB metal source and/or a Group VIII metal source or in a separate step. The organic additive is added in amount of about 1 to about 30 wt % C, and preferably about 1 to about 20 wt % C, and more preferably about 5 to about 15 wt % C by weight of the final catalyst. Such organic additives include an organic compound selected from the group consisting of compounds comprising at least two oxygen atoms and 2-carbon atoms and the compounds built up from these compounds. The organic compound preferably is selected from the group of compounds comprising at least two oxygen-containing moieties, such as a carboxyl, carbonyl or hydroxyl moiety, and 2-10 carbon atoms, and the compounds built up from these compounds. The latter may be, e.g., the ether, ester, acetal, acid chloride, acid amide, oligomer or polymer of this organic compound. Examples of suitable organic compounds include citric acid, tartaric acid, oxalic acid, malonic acid, malic acid, butanediol, pyruvic aldehyde, glycol aldehyde, and acetaldol. Organic compounds selected from the group of compounds comprising at least two hydroxyl groups and 2-10 carbon atoms per molecule and the compounds built up from these compounds are also preferred. These include, e.g., gluconic acid, tartaric acid, or aliphatic alcohols such as ethylene glycol, propylene glycol, glycerin, trimethylol ethane, trimethylol propane, etc. Compounds built up from these organic compounds include oligo- and polymers, e.g., diethylene glycol, dipropylene glycol, trimethylene glycol, triethylene glycol, tributylene glycol, tetraethylene glycol, tetrapentylene glycol. This range can be extrapolated to include, e.g., polyethers like polyethylene glycol. For this last compound, polyethylene glycol with a molecular weight between 200 and 8,000 is preferred. Other compounds built up from these organic compounds are, e.g., ethers such as ethylene glycol monobutyl ether, diethylene glycol monomethyl ether, diethylene glycol monoethyl ether, diethylene glycol monopropyl ether, and diethylene glycol monobutyl ether. Preferred organic compounds are, int. al., ethylene glycol, diethylene glycol, polyethylene glycol, or mixtures thereof. Another group of organic compounds comprising at least two hydroxyl groups and 2-10 carbon atoms per molecule is formed by, e.g., monosaccharides such as glucose and fructose.

The organic additive may also be a sulfur-containing organic compound. The sulfur-containing organic compound is a mercapto-carboxylic acid of formula HS—R—COOH, where R is a linear or branched, and saturated or unsaturated carbon backbone ($C_1$-$C_{11}$ with or without hetero atoms such as nitrogen) with optionally a nitrogen-containing functional group such as amine, amide, etc. Suitable examples of such mercapto-carboxylic acid include, but are not limited to, thioglycolic acid, thiolactic acid, thiopropionic acid, mercapto succinic acid, and cysteine.

The metals, additional phosphorus, and the organic additive can be introduced onto the extrudates in one or more steps. The solutions used may or may not be heated.

In the practice of this invention, the impregnation solution may optionally include a phosphorus component. The phosphorous component is a compound which is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates (mono-ammonium di-hydrogen phosphate, di-ammonium mono-hydrogen phosphate, tri-ammonium phosphate). Mixtures of two or more phosphorus compounds can be used. The phosphorus compound may be used in liquid or solid form. A preferred phosphorus compound is orthophosphoric acid ($H_3PO_4$) or an ammonium hydrogen phosphate, preferably in aqueous solution. The amount of phosphorus compound employed in the catalyst will preferably be at least about 1 wt. % (as oxide $P_2O_5$), based on the total weight of the catalyst and more preferably in the range of about 1 to about 8 wt. % (as oxide $P_2O_5$), based on the total weight of the catalyst.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., a polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

Regardless of the approach (ex situ vs in situ), catalysts described in this invention can be activated using the conventional start-up techniques known in the art. Typically, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a sulfur-containing hydrocarbon feed, without any added sulfiding agent, since the sulfur components present in the feed will be converted into hydrogen sulfide in the presence of the catalyst.

The catalyst compositions of this invention are those produced by the above-described process, whether or not the process included an optional sulfiding step.

The formed catalyst product of this invention is suitable for use in hydrotreating, hydrodenitrogenation and/or hydrodesulfurization (also collectively referred to herein as "hydrotreating") of hydrocarbon feed stocks when contacted by the catalyst under hydrotreating conditions. Such hydrotreating conditions are temperatures in the range of 250-450° C., pressure in the range of 5-250 bar, liquid space velocities in the range of 0.1-10 liter/hour and hydrogen/oil ratios in the range of 50-2000 Nl/l. Examples of suitable hydrocarbon feeds to be so treated vary widely, and include middle distillates, kero, naphtha, vacuum gas oils, heavy gas oils, and the like.

The following describes experimental preparation of the support and the catalyst, as well as use of the catalyst in hydrotreating a hydrocarbon feedstock to illustrate activity of the catalysts so formed. This information is illustrative only, and is not intend to limit the invention in any way.

EXAMPLES

Activity Test

The activity tests were carried out in a micro flow reactor. Light Gas Oil (LGO) spiked with dimethyl disulfide (DMDS) (total S content of 2.5 wt %) was used for presulfiding. A Straight-run Gas Oil (SRGO), having a S content of 1.4-1.1 wt. % and a N content of 240-200 ppm, was used for medium pressure ULSD testing in Examples A-F. A Vacuum Gas Oil (VGO) feed with S content of 2.1 wt. % S and 1760 ppmN was used for HC-PT testing in Example G. Catalysts were evaluated at equal volume, unless stated otherwise. The relative volumetric activities for the various catalysts were determined as follows. For each catalyst the volumetric reaction constant $k_{vol}$ was calculated using $n^{th}$ order kinetics and a reaction order of 1.0 for HDN and 1.2 for HDS. The relative volumetric activities (RVA) of the different catalysts of the invention vs a comparative catalyst were subsequently calculated by taking the ratio of the reaction constants. In the tables, SA is surface area, PV is pore volume, DMPD is mean pore diameter based on the desorption branch of the $N_2$ physisorption isotherm, S is sulfur, N is nitrogen, P is pressure, $g_{cat}$ is the amount of catalyst in the reactor, LHSV is liquid hourly space velocity and r.o. is reaction order.

Support Preparation

The following supports were made in accordance with the procedures described below. One support was prepared as a reference (S1, $Al_2O_3$). A summary of the properties for each support can be found in Table 1.

Example S1: Comparative S1

Comparative S1 was 100% standard $Al_2O_3$ prepared via a co-precipitation process. Aluminum sulfate (Alum) and sodium aluminate (Natal) were dosed simultaneously to a heel of water at 60° C. and pH 8.5. The flows of Natal and Alum were fixed and the pH was controlled constantly with NaOH or $H_2SO_4$. Total dosing time was approximately 1 hour and the final $Al_2O_3$ concentration in the reactor was approximately 4% on weight basis. The pH was then raised with NaOH or Natal to approximately 10 and the slurry was aged for 10 minutes while stirring. The slurry was filtered over a filter cloth and washed with water or a solution of ammonium bi-carbonate in water until sufficient removal of sodium and sulfate. The cake was dried, extruded and calcined.

Example S2: Support S2

The support S2 was prepared via a co-extrusion process of alumina and titania filter cakes. The alumina filter cake was prepared via the process described in Example S1 (prior extrusion). The titania filter cake was prepared via hydrolysis of an aqueous solution of $TiOSO_4$ at 99° C. for 5 hours followed by neutralization with NaOH to pH 7. The precipitate was filtered and washed salt free using water or ammonium bi-carbonate solution. The two filter cakes were mixed in a kneader and extruded. The extrudates were calcined at 650° C. for 1 hour under airflow of ca. 10 nL/min. The final composition of the support (dry base) was found to be 49.7 wt. % $TiO_2$ and 50.3 wt. % $Al_2O_3$.

Example S3: Support S3

The support S3 was prepared via a co-precipitation process. Aluminum sulfate (Alum) and Titanyl sulfate ($TiOSO_4$) mixed in one stream and sodium aluminate (Natal) were dosed simultaneously to a heel of water at 60° C. and pH 8.5. The flows of Natal and Alum/$TiOSO_4$ were fixed and the pH was controlled constantly with NaOH or $H_2SO_4$. Total dosing time was approximately 1 hour and the final solid concentration in the reactor was approximately 4% on weight basis. The pH was then raised with NaOH or Natal to approximately 10 and the slurry was aged for 20 minutes while stirring. The slurry was filtered over a filter cloth and washed with water or a solution of ammonium bi-carbonate in water until sufficient removal of sodium and sulfate. The cake was dried, extruded and calcined at 650° C. for 1 hour under airflow of ca. 10 nL/min. The final composition of the support (dry base) was found to be 48.0 wt. % $TiO_2$ and 52.0 wt. % $Al_2O_3$.

Example S4: Support S4

The support S4 was prepared by co-precipitation using the same process as was used to prepare support S3, but using different amounts of the $TiO_2$ and $Al_2O_3$ precursors. The final composition of the support (dry base) was found to be 20.9 wt. % $TiO_2$ and 79.1 wt. % $Al_2O_3$.

Example S5: Support S5

The support S5 was prepared by consecutive precipitation of alumina and titania. Firstly alumina (boehmite) was precipitated according to the procedure as described in Example S1 After filtration and proper washing, the precipitate was transferred back to the reactor. Boehmite filter cake was slurried in a stainless steel vessel with water and stirred while heating up to 60° C. To the slurry $TiOSO_4$ solution was dosed at a fixed rate and the pH was controlled at 8.5 via addition of NaOH solution. The dosing time was 25 minutes at 60° C. The slurry was thoroughly washed using water or ammonium bi-carbonate solution to remove salts, dried, extruded and calcined at 650° C. for 1 hour under airflow of ca. 10 nL/min. The final composition of the support (dry base) was found to be 21.1 wt. % $TiO_2$ and 78.9 wt. % $Al_2O_3$.

Example S6: Support S6

The support S6 was prepared by coating an aqueous titania precursor on alumina extrudates. The extrudates used consisted predominantly of γ-alumina and had a surface area of 271 $m^2/g$, a pore volume of 0.75 ml/g and a mean pore diameter of 8.7 nm as determined from the $N_2$ physisorption desorption isotherm. The pores of the alumina extrudates were filled with an aqueous solution of Titanium(IV)bis (ammonium lactato)dihydroxide, aged for 2 hours at 60° C. and pre-dried in a rotating pan and eventually dried overnight at 120° C. The sample was calcined at 450° C. for 2 hours under airflow. This procedure was repeated a second time reaching higher titania loadings. The final composition of the support (dry base) was found to be 27.8 wt. % $TiO_2$ and 72.2 wt. % $Al_2O_3$.

Example S7: Support S7

The support S7 was prepared by coating an alkoxide titania precursor on alumina extrudates. The extrudates used had the same characteristics as those used in Example S6. The pores of the alumina were filled with Ti-isopropoxide solution in propanol. The aging process was carried out inside an atmosbag filled with a $N_2$ atmosphere at room temperature for 2 hours, and then the same is placed outside of the atmosbag for hydrolysis overnight (at RT). Finally the sample is dried at 120° C. overnight. The sample was calcined at 450° C. for 2 hours. The final composition of the support (dry base) was found to be 18.9 wt. % $TiO_2$ and 81.1 wt. % $Al_2O_3$.

Example S8: Support S8

The support S8 was prepared by a second coating with an alkoxide titania precursor on the $TiO_2$—$Al_2O_3$ extrudates obtained in Example S7. The procedure as described in Example S7 was repeated a second time reaching higher titania loadings. The final composition of the support (dry base) was found to be 43.7 wt. % $TiO_2$ and 56.3 wt. % $Al_2O_3$.

Example S9: Comparative S9

The support S9 was prepared by strike-precipitation of alumina and titania. Natal was diluted in water and under vigorous stirring waterglass was added while heating at 60° C. To this mixture aluminum sulfate and titanyl sulfate were added in 20 minutes with a final pH of 6.5. NaOH was used to adjust the pH to 7.2 and the mixture was aged for 1 hour at 60° C. while stirring. The cake is re-slurried with water, brought to pH 10 with ammonia and aged at 95° C. for 1 hour while stirring. Then, the slurry is filtered and washed with water to remove excess ammonia, dried, extruded and calcined at 650° C. for 1 hour under airflow of ca. 10 nL/min with 25 vol. % steam. The final composition of the support (dry base) was found to be 23.1 wt. % $TiO_2$, 3.2 wt. % $SiO_2$ and 73.7 wt. % $Al_2O_3$.

Example S10: Support S10

The support S10 was prepared by strike-precipitation of alumina, titania and silica in the same way as S9 using different amounts of the raw materials. The final composition of the support (dry base) was found to be 21.3 wt. % $TiO_2$, 0.6 wt. % $SiO_2$ and the rest is $Al_2O_3$.

Example S11: Comparative S11

The support S11 was prepared by strike-precipitation of alumina, titania and silica in the same way as S9 using different amounts of the raw materials. In this case, the extrudates were calcined at 750° C. for 1 hour under airflow of ca. 10 nL/min with 25 vol. % steam. The final composition of the support (dry base) was found to be 21.0 wt. % $TiO_2$, 9.9 wt. % $SiO_2$ and the rest is $Al_2O_3$.

Example S12: Support S12

The support S12 was prepared by strike-precipitation of alumina, titania and silica in the same way as S9 using different amounts of the raw materials. The final composition of the support (dry base) was found to be 20.9 wt. % $TiO_2$, 0.02 wt. % $SiO_2$ and the rest is $Al_2O_3$.

Example S13: Support S13

The support S13 was prepared in the same way as S9, but lower $TiO_2$ and $SiO_2$ sources were used. The final composition of the support (dry base) was found to be 10.8 $TiO_2$ wt. %, 0.5 $SiO_2$ wt. % and 88.7 $Al_2O_3$ wt. %.

Example S14: Support S14

The support S14 was prepared via a co-precipitation process. Aluminum sulfate (Alum) in one stream and sodium aluminate (Natal) were dosed simultaneously to a heel of water and waterglass at 50° C. and pH 8.7. The flows of Natal and Alum were fixed and the pH was controlled constantly with NaOH or $H_2SO_4$. Total dosing time was approximately 0.5 hour and the final solid concentration in the reactor was approximately 3.5% on weight basis. The slurry was filtered over a filter cloth and washed with water. The cake was dried, extruded and calcined at 650° C. with steam (25%) for 1 hour under airflow of ca. 10 nL/min. The final composition of the support (dry base) was found to be 1.0 wt. % $SiO_2$ and the rest is $Al_2O_3$.

Example S15: Support S15

The support S15 was prepared by co-extrusion/kneading of $Al_2O_3$ cake (S14) and a titanium source. The Titanium (IV)isopropoxide was added after 15 minutes kneading time. Later a vent hole was opened in order to let the alcohol evaporate. The kneaded material was extruded and then, the plate with wet extrudates was placed in the stove and kept there overnight at 120° C. Finally, the sample was calcined at 710° C. The final composition of the support (dry base) was found to be 10.6 wt. % $TiO_2$, 0.82 wt. % $SiO_2$ and the rest is $Al_2O_3$.

Example S16: Support S16

The support S16 was prepared in the same way as S9, but lower $TiO_2$ and $SiO_2$ sources were used. The final composition of the support (dry base) was found to be 5.4 $TiO_2$ wt. %, 0.57 $SiO_2$ wt. % and the rest $Al_2O_3$ wt. %.

Example S17: Support S17

The support S17 was prepared in the same way as S9, but lower $TiO_2$ and $SiO_2$ sources were used. The final composition of the support (dry base) was found to be 10.6 $TiO_2$ wt. %, 0.73 $SiO_2$ wt. % and the rest $Al_2O_3$ wt. %.

Example S18: Support S18

The support S18 was prepared in the same way as S9, but lower $SiO_2$ sources were used. The final composition of the support (dry base) was found to be 21.6 $TiO_2$ wt. %, 0.51 $SiO_2$ wt. % and the rest $Al_2O_3$ wt. %.

The sodium content present is any of these supports is very low (<0.5 wt %), since it is known as detrimental for the hydroprocessing activity.

TABLE 1

Summary of supports used during examples.

| Support | Procedure | Weight % $TiO_2$ (*) | Weight % $SiO_2$ (*) | SA ($m^2$/g) | PV (ml/g) | DMPD (nm) |
|---|---|---|---|---|---|---|
| S1 | ref. | — | — | 271 | 0.84 | 8.1 |
| S2 | co-extrusion | 47.9 | — | 200 | 0.52 | 8.7 |
| S3 | co-precipitation | 48.0 | — | 258 | 0.64 | 7.7 |
| S4 | co-precipitation | 20.9 | — | 304 | 0.86 | 7.9 |
| S5 | step-precipitation | 21.1 | — | 239 | 0.78 | 9.4 |
| S6 | coating | 27.8 | — | 275 | 0.48 | 7.8 |
| S7 | coating | 18.9 | — | 271 | 0.60 | 8.1 |
| S8 | coating | 43.7 | — | 229 | 0.38 | 5.5 |
| S9 | strike-precipitation | 23.1 | 3.2 | 293 | 0.56 | 6.1 |
| S10 | strike-precipitation | 21.3 | 0.6 | 236 | 0.59 | 8.1 |
| S11 | strike-precipitation | 21.0 | 9.9 | 270 | 0.61 | 7.1 |
| S12 | strike-precipitation | 20.9 | 0.02 | 172 | 0.40 | 7.2 |
| S13 | strike-precipitation | 10.8 | 0.53 | 240 | 0.65 | 9.0 |
| S14 | ref. | — | 1.0 | 257 | 0.60 | 7.2 |
| S15 | co-extrusion | 10.6 | 0.82 | 225 | 0.54 | 7.4 |
| S16 | strike-precipitation | 5.4 | 0.57 | 216 | 0.63 | 9.0 |
| S17 | strike-precipitation | 10.6 | 0.73 | 225 | 065 | 9.0 |
| S18 | strike-precipitation | 21.6 | 0.51 | 219 | 0.59 | 8.5 |

* based on the total weight of the support dry base

Catalyst Preparation and Testing

Example A: Positive Effect of TiO$_2$ Addition in Different Amounts and Via Different Preparation Methods on the Activity of NiMo Catalysts The following examples illustrate the positive effect of TiO$_2$ addition in the support on the activity of NiMo catalysts when combined with organics in the catalyst preparation. The catalysts were prepared as described in examples A1-A11 using the same method to apply metals and organic additives to the catalysts and have a comparable volume loading of metals in the reactor. Approximately 0.9 ml of each of the catalysts was tested in a multi-reactor unit under medium pressure ultra-low sulfur diesel conditions. Table 2 shows the pre-sulfidation and test conditions and Table 3 shows the activity results.

TABLE 2

Pre-sulfiding and test (medium P ULSD) format used for activity testing of NiMo examples A.

| | | Pre-sulfiding conditions | | | |
|---|---|---|---|---|---|
| Feed | LHSV (1/hr) | P (bar) | H$_2$/oil (Nl/l) | Temperature (° C.) | Time (hours) |
| Spiked LGO | 3 | 45 | 300 | 320 | 24 |

| | Testing conditions | | | |
|---|---|---|---|---|
| Feed | P (bar) | H$_2$/oil (Nl/l) | Temperature (° C.) | Time @ condition (days) |
| SRGO 1.09 wt. % S and 200 ppmN | 45 | 300 | 350 | 4 |

Example A1: Comparative A1

Comparative A1 was prepared by consecutive impregnation of support Comparative A1 with (i) a NiMoP aqueous solution and, after drying, (ii) with thioglycolic acid. The metal loaded intermediate was prepared from support S1 using impregnation with an amount of aqueous NiMoP solution equivalent to fill 105% of the pore volume, as is known for a person skilled in the art. The pore volume of the support was determined by a so-called water PV measurement in which the point of incipient wetness was determined by addition of water to the carrier extrudates. The NiMoP solution was prepared by dispersing of the required amount of NiCO$_3$ in water. The solution was then heated to 60° C. while stirring. Half of the required H$_3$PO$_4$ was added carefully to the solution and subsequently MoO3 was added in small portions. The solution was heated up to 92° C. to obtain a clear solution. Finally, the rest of the H$_3$PO$_4$ was added to the solution and water was added to reach the concentration required for the desired metal loading. After impregnation, the extrudates were allowed to age for 1 hour in a closed vessel, after which drying was carried out at 120° C. for at least one hour. Subsequently, impregnation of the thus formed metal loaded intermediate with thioglycolic acid was carried out with neat thioglycolic acid to reach a loading of this compound on the catalysts of 3.5 mol/mol metals (Mo+Ni) in the catalyst at ambient temperature. The thus formed composite was further aged for 2 hour, while rotating. The extrudates were then poured out into a petri dish and placed in a static oven at 80° C. for 16 hours. Both impregnations were performed in a rotating pan. The composition of the metal impregnated dried catalyst (dry base) was 23.0 wt. % MoO$_3$, 4.5 wt. % NiO, 4.0 wt. % P$_2$O$_5$ and the rest is Al$_2$O$_3$.

Example A2: Invention A2

Invention A2 was prepared using support S2 and the same preparation process as A1. The composition of the metal impregnated dried catalyst (dry base) was 17.2 wt. % MoO$_3$ and 3.3 wt. % NiO, 3.1 wt. % P$_2$O$_5$, 38.6 wt. % TiO$_2$ and the rest is Al$_2$O$_3$.

Example A3: Invention A3

Invention A3 was prepared using support S3 and the same preparation process as A1. The composition of the metal impregnated dried catalyst (dry base) was 19.4 wt. % MoO$_3$ and 3.8 wt. % NiO, 3.5 wt. % P$_2$O$_5$, 37.4 wt. % TiO$_2$ and the rest is Al$_2$O$_3$.

Example A4: Invention A4

Invention A4 was prepared using support S4 and the same preparation process as A1. The composition of the metal impregnated dried catalyst (dry base) was 23.7 wt. % MoO$_3$ and 4.5 wt. % NiO, 4.1 wt. % P$_2$O$_5$, 13.0 wt. % TiO$_2$ and the rest is Al$_2$O$_3$.

Example A5: Invention A5

Invention A5 was prepared using support S5 and the same preparation process as A1. The composition of the metal impregnated dried catalyst (dry base) was 24.4 wt. % MoO$_3$ and 4.7 wt. % NiO, 4.3 wt. % P$_2$O$_5$, 13.5 wt. % TiO$_2$ and the rest is Al$_2$O$_3$.

Example A6: Invention A6

Invention A6 was prepared using support S6 and the same preparation process as A1. The composition of the metal impregnated dried catalyst (dry base) was 18.0 wt. % MoO$_3$ and 3.4 wt. % NiO, 3.1 wt. % P$_2$O$_5$, 21.2 wt. % TiO$_2$ and the rest is Al$_2$O$_3$.

Example A7: Invention A7

Invention A7 was prepared using support S7 and the same preparation process as A1. The composition of the metal impregnated dried catalyst (dry base) was 20.1 wt. % MoO$_3$ and 4.0 wt. % NiO, 3.5 wt. % P$_2$O$_5$, 12.6 wt. % TiO$_2$ and the rest is Al$_2$O$_3$.

Example A8: Invention A8

Invention A8 was prepared using support S8 and the same preparation process as A1. The composition of the metal impregnated dried catalyst (dry base) was 18.7 wt. % MoO$_3$ and 3.7 wt. % NiO, 3.4 wt. % P$_2$O$_5$, 25.9 wt. % TiO$_2$ and the rest is Al$_2$O$_3$.

Example A9: Comparative A9

Comparative A9 was prepared using support S1 and the same preparation process as A1. The composition of the metal impregnated dried catalyst (dry base) was 24.8 wt. % MoO$_3$ and 4.4 wt. % NiO, 4.3 wt. % P$_2$O$_5$ and the rest is Al$_2$O$_3$.

Example A10: Invention A10

Invention A10 was prepared using support S10 and the same preparation process as A1. The composition of the metal impregnated dried catalyst (dry base) was 22.0 wt. % $MoO_3$ and 3.7 wt. % NiO, 3.8 wt. % $P_2O_5$, 0.37 wt. % $SiO_2$, 15.0 $TiO_2$ wt. % and the rest is $Al_2O_3$.

Example A11: Invention A11

Invention A11 was prepared using support S13 and the same preparation process as A1. The composition of the metal impregnated dried catalyst (dry base) was 23.6 wt. % $MoO_3$ and 4.1 wt. % NiO, 4.0 wt. % $P_2O_5$, 0.36 wt. % $SiO_2$, 7.4 wt. % $TiO_2$ and the rest is $Al_2O_3$.

TABLE 3

The effect of the addition of $TiO_2$ in combination with an organic on the activity of supported NiMo catalysts in medium P ULSD activity testing.

| Example | Support | $g_{CAT}$ db Reactor | mg $MoO_3$ Reactor | LHSV HDN | N (ppm) | RVA HDN r.o. 1.0 | LHSV HDS | S (ppm) | RVA HDS r.o. 1.2 |
|---|---|---|---|---|---|---|---|---|---|
| Comparative A1 | S1 | 0.720 | 184 | 4.0 | 49 | 100% | 2.5 | 151 | 100% |
| Invention A2 | S2 | 0.881 | 168 | | 40 | 108% | | 99 | 113% |
| Invention A3 | S3 | 0.794 | 171 | | 22 | 152% | | 42 | 151% |
| Invention A4 | S4 | 0.647 | 170 | | 44 | 105% | | 119 | 107% |
| Invention A5 | S5 | 0.640 | 173 | | 35 | 123% | | 65 | 130% |
| Invention A6 | S6 | 0.990 | 189 | | 9 | 211% | | 24 | 170% |
| Invention A7 | S7 | 0.844 | 184 | | 19 | 165% | | 33 | 169% |
| Invention A8 | S8 | 0.936 | 195 | | 11 | 197% | | 28 | 171% |
| Comparative A9 | S1 | 0.719 | 198 | | 58 | 100% | 2.7 | 144 | 100% |
| Invention A10 | S10 | 0.855 | 209 | | 9 | 246% | | 24 | 177% |
| Invention A11 | S13 | 0.820 | 215 | | 19 | 190% | | 29 | 169% |

As can be seen in Table 3, the catalysts that were prepared using a Ti-containing support are significantly more active in HDN and HDS than the comparative catalyst without any Ti (A1, A10) using the same S-containing organic additive and impregnation method. Since different LHSV have been used, RVAs of Inventions A2-A9 are relative to the activity of Comparative A1 and RVAs of Inventions A11-A12 are relative to Comparative A10.

The prior art teaches that it is critical to obtain a good dispersion of the $TiO_2$ phase in $TiO_2/Al_2O_3$ based hydroprocessing catalysts enable to observe the most positive effect of $TiO_2$ addition on catalyst activity. This is for example expressed in [U.S. Pat. No. 9,061,265B2] in a claim regarding the relative intensity of the anatase and rutile $TiO_2$ peaks vs. the intensity of the $\gamma$-$Al_2O_3$ peak at ° 2 theta in the XRD pattern. In FIG. 1, the XRD patterns of the catalysts of the invention are presented. It can be observed that the intensity of the anatase $TiO_2$ (101) peak (around 26° 2 theta) vs the $\gamma$-$Al_2O_3$ (400) peak (around 46° 2 theta) ratio varies greatly between the different catalysts of the invention, with a number of catalysts exhibiting a anatase/$\gamma$-$Al_2O_3$ peak ratio that is much higher than what is claimed to be advantageous in the prior art. Also, there seems to be no obvious link between $TiO_2$ dispersion and catalyst activity, when applying the preparation method of the invention. For example, Invention A5 shows a relative anatase $TiO_2$ peak vs $\gamma$-$Al_2O_3$ peak intensity that is much higher than what is observed for Invention A4, which is likewise prepared via precipitation and roughly contains the same wt. % of $TiO_2$. To our surprise, and in contrast to what is taught in the art, the activity of Invention A5 is significantly higher than that of Invention A4. Apparently the preparation method used and the organics applied removes the need for a very good $TiO_2$ dispersion in preparation of a highly active $TiO_2/Al_2O_3$ based hydroprocessing catalyst.

Examples B: Positive Effect of $TiO_2$ Addition in Different Amounts and Via Different Preparation Methods on the Activity of CoMo Catalysts These examples illustrate the positive effect of addition of $TiO_2$ in the support on the activity of CoMo catalysts when combined with organics in the preparation in a wide range of $TiO_2$ contents. Catalysts B1-B8 were all prepared using the same method to apply metals and thioglycolic acid to the catalyst and have a comparable volume loading of metals in the reactor. The catalysts were tested in a multi-reactor unit under medium pressure ultra-low sulfur diesel conditions. Table 4 shows the pre-sulfidation and Table 5 shows the activity results.

TABLE 4

Pre-sulfiding and test (medium P ULSD) format used for activity testing of CoMo examples B.

| Pre-sulfiding conditions | | | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

| Testing conditions | | | | |
|---|---|---|---|---|
| Feed | P (bar) | $H_2$/oil (Nl/l) | Temperature (° C.) | Time @ condition (days) |
| SRGO with 1.09 wt. % S and 200 ppmN | 45 | 300 | 350 | 4 |

Example B1: Comparative B1

Comparative B1 was prepared by consecutive impregnation of support Comparative A1 with (i) a CoMoP aqueous solution and, after drying, (ii) with thioglycolic acid. Both impregnations were performed in a rotating pan. The metal loaded intermediate was prepared from support S1 using impregnation with an amount of aqueous CoMoP solution equivalent to fill 105% of the pore volume, as is known for a person skilled in the art. The pore volume of the support was determined by a so-called water PV measurement in which the point of incipient wetness was determined by addition of water to the carrier extrudates. The CoMoP solution was prepared by dispersing of the required amount of $CoCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. Subsequently, impregnation of the thus formed metal loaded intermediate with thioglycolic acid was carried out with neat thioglycolic acid to reach a loading of this compound on the catalysts of 3.5 mol/mol metals (Mo+Co) in the catalyst. The thus formed composite was further aged for 2 hour, while rotating. The extrudates were then poured out into a petri dish and placed in a static oven at 80° C. for 16 hours. The composition of the metal impregnated dried catalyst (dry base) was 24.0 wt. % $MoO_3$ and 4.6 wt. % CoO, 4.2 wt. % $P_2O_5$ and the rest is $Al_2O_3$.

Example B2: Invention B2

Invention B2 was prepared using support S3 and the same preparation process as B1. The composition of the metal impregnated dried catalyst (dry base) was 19.1 wt. % $MoO_3$ and 3.6 wt. % CoO, 3.3 wt. % $P_2O_5$, 37.2 wt. % $TiO_2$ and the rest is $Al_2O_3$.

Example B3: Invention B3

Invention B3 was prepared using support S5 and the same preparation process as B1. The composition of the metal impregnated dried catalyst (dry base) was 19.8 wt. % $MoO_3$ and 3.8 wt. % CoO, 3.3 wt. % $P_2O_5$, 12.4 wt. % $TiO_2$ and the rest is $Al_2O_3$.

Example B4: Inventive B4

Invention B4 was prepared using support S6 and the same preparation process as B1. The composition of the metal impregnated dried catalyst (dry base) was 19.1 wt. % $MoO_3$ and 3.6 wt. % CoO, 3.3 wt. % $P_2O_5$, 20.7 wt. % $TiO_2$ and the rest is $Al_2O_3$.

Example B5: Invention B5

Invention B5 was prepared using support S7 and the same preparation process as B1. The composition of the metal impregnated dried catalyst (dry base) was 19.8 wt. % $MoO_3$ and 3.8 wt. % CoO, 3.5 wt. % $P_2O_5$, 20.1 wt. % $TiO_2$ and the rest is $Al_2O_3$.

Example B6: Comparative B6

Comparative B6 was prepared using support S1 and the same preparation process as B1. The composition of the metal impregnated dried catalyst (dry base) was 26.1 wt. % $MoO_3$ and 4.8 wt. % CoO, 4.4 wt. % $P_2O_5$ and the rest is $Al_2O_3$.

Example B7: Invention B7

Invention B7 was prepared using support S10 and the same preparation process as B1. The composition of the metal impregnated dried catalyst (dry base) was 23.4 wt. % $MoO_3$ and 3.9 wt. % CoO, 4.0 wt. % $P_2O_5$, 0.36 wt. % $SiO_2$, 14.7 wt. % $TiO_2$ and the rest is $Al_2O_3$.

Example B8: Invention B8

Invention B8 was prepared using support S13 and the same preparation process as B1. The composition of the metal impregnated dried catalyst (dry base) was 20.5 wt. % $MoO_3$ and 4.3 wt. % CoO, 4.3 wt. % $P_2O_5$, 0.36 wt %. $SiO_2$, 7.2 wt. % $TiO_2$ and the rest is $Al_2O_3$.

TABLE 5

The effect of the addition of a sulfur containing organic in combination with $TiO_2$-containing support in the activity of CoMo catalysts in medium P ULSD activity testing.

| Example | Support | $g_{CAT}$ db Reactor | mg $MoO_3$ Reactor | LHSV HDN | N (ppm) | RVA HDN r.o. 1 |
|---|---|---|---|---|---|---|
| Comparative B1 | S1 | 0.730 | 194 | 3.5 | 50 | 100% |
| Invention B2 | S3 | 0.837 | 180 | | 26 | 158% |
| Invention B3 | S5 | 0.829 | 182 | | 34 | 131% |
| Invention B4 | S6 | 0.919 | 187 | | 21 | 160% |
| Invention B5 | S7 | 0.891 | 196 | | 20 | 174% |
| Comparative B6 | S1 | 0.701 | 203 | 4.0 | 88 | 100% |
| Invention B7 | S10 | 0.893 | 232 | | 19 | 259% |
| Invention B8 | S13 | 0.812 | 226 | | 40 | 186% |

As can be seen in Table 5, the catalysts that were prepared on a Ti-containing supports (B2-B5, B7 and B8) are significantly more active in HDN than the comparative catalysts without any Ti (B1 and B6) using the same organic additive and impregnation method. Since different LHSV have been used, RVAs of Inventions B2-B5 are relative to the activity of Comparative B1 and RVA of Inventions B7 and B8 are relative to Comparative B6.

Examples C: The Effect of Organics Addition on Activity and the Limited Effect of $SiO_2$-Content on Activity of $TiO_2$—$Al_2O_3$ Supported CoMo Catalysts In the following examples it is illustrated that the inclusion of $SiO_2$ in the catalyst composition has only a very modest, if any effect on catalyst activity. Supports with a variation in $SiO_2$ content were prepared using a co-precipitation method and these were used to make CoMo catalysts according to the preparation method of the invention and comparable metal loadings per reactor volume. The catalysts were tested in a multi-reactor unit under medium pressure hydrotreating of a SRGO. Table 6 shows the pre-sulfidation and test conditions that were used for testing and Tables 7 shows the activity results that were obtained.

TABLE 6

Pre-sulfiding and test (medium P ULSD) format used for activity testing of CoMo examples C.

| | | Pre-sulfiding conditions | | | |
|---|---|---|---|---|---|
| Feed | LHSV (1/hr) | P (bar) | $H_2$/oil (Nl/l) | Temperature (° C.) | Time (hours) |
| Spiked LGO | 3 | 45 | 300 | 320 | 24 |

TABLE 6-continued

Pre-sulfiding and test (medium P ULSD) format used for activity testing of CoMo examples C.

| | Testing conditions | | | |
|---|---|---|---|---|
| Feed | P (bar) | H₂/oil (Nl/l) | Temperature (° C.) | Time @ condition (days) |
| SRGO with 1.4 wt. % S and 200 ppmN | 45 | 300 | 350 | 3 |

Example C1: Comparative C1

Comparative C1 was prepared using support S1 and impregnated with CoMoP aqueous solution without organics. Preparation of the CoMoP solution and impregantion was done according to the procedure described in Example B1. The composition of the metal impregnated dried catalyst (dry base) was 26.4 wt. % $MoO_3$ and 4.8 wt. % CoO, 4.2 wt. % $P_2O_5$ and the rest is $Al_2O_3$.

Example C2: Comparative C2

Comparative C2 was prepared using support S9 and impregnated, as C1, with a CoMoP aqueous solution without organics. The composition of the metal impregnated dried catalyst (dry base) was 24.1 wt. % $MoO_3$ and 3.6 wt. % CoO, 3.9 wt. % $P_2O_5$, 15.3 wt. % $TiO_2$.

Example C3: Comparative C3

Comparative C3 was prepared using support S9. Firstly, it was impregnated with CoMoP aqueous solution as Example C1 and after drying a second impregnation with thioglycolic acid (3.5 mol/mol metals in the catalyst) in a rotating pan was performed. The intermediate was further aged for 2 hours, while rotating, and then poured out into a petri dish and placed in a static oven at 80° C. for 16 hours. The composition of the metal impregnated dried catalyst (dry base) was 24.2 wt. % $MoO_3$ and 4.5 wt. % CoO, 4.1 wt. % $P_2O_5$, 13.9 wt. % $TiO_2$, 1.8 wt. % $SiO_2$ wt % and the rest is $Al_2O_3$.

Example C4: Comparative C4

Invention C5 was prepared using support S10 and the same impregnation procedure as Example C3. The composition of the metal impregnated dried catalyst (dry base) was 26.1 wt. % $MoO_3$ and 4.8 wt. % CoO, 4.3 wt. % $P_2O_5$, 13.5 wt. % $TiO_2$, 6.4 wt. % $SiO_2$ and the rest is $Al_2O_3$.

Example C5: Invention C5

Invention C4 was prepared using support S11 and the same impregnation procedure as Example C3. The composition of the metal impregnated dried catalyst (dry base) was 22.3 wt. % $MoO_3$ and 4.3 wt. % CoO, 3.8 wt. % $P_2O_5$, 14.5 wt. % $TiO_2$, 0.4 wt. % $SiO_2$ and the rest is $Al_2O_3$.

Example C6: Invention C6

Invention C6 was prepared using support S12 and the same impregnation procedure as in Example C3. The composition of the metal impregnated dried catalyst (dry base) was 24.4 wt. % $MoO_3$ and 4.5 wt. % CoO, 4.1 wt. % $P_2O_5$, 13.7 wt. % $TiO_2$, 0.1 wt. % $SiO_2$ and the rest is $Al_2O_3$.

TABLE 7

The effect of the addition of an organic in combination with $TiO_2$-containing support in the activity of CoMo catalysts in medium P ULSD activity testing and the limited effect of $SiO_2$ addition.

| Example | Support | $SiO_2$ wt. % | Additive | $g_{CAT}$ db Reactor | mg $MoO_3$ Reactor | LHSV HDN | N (ppm) | RVA HDN r.o. 1 | LHSV HDS | S (ppm) | RVA HDS r.o. 1.2 |
|---|---|---|---|---|---|---|---|---|---|---|---|
| Comparative C1 | S1 | — | No organic | 0.732 | 211 | 3.7 | 86 | 100% | 2.6 | 211 | 100% |
| Comparative C2 | S9 | 3.2 | No organic | 0.778 | 220 | | 56 | 145% | | 150 | 111% |
| Comparative C3 | S9 | 3.2 | Thioglycolic acid | 0.798 | 222 | | 7 | 345% | | 23 | 186% |
| Comparative C4 | S11 | 9.9 | Thioglycolic acid | 0.703 | 219 | | 16 | 271% | | 38 | 165% |
| Invention C5 | S10 | 0.6 | Thioglycolic acid | 0.774 | 218 | | 10 | 319% | | 26 | 182% |
| Invention C6 | S12 | — | Thioglycolic acid | 0.912 | 216 | | 19 | 258% | | 35 | 171% |

From the test results in Table 7, it can be observed that regardless of the $SiO_2$ in the support, a large activity benefit is observed for the catalysts based on a $TiO_2/Al_2O_3$ support in combination with the preparation method that involves the use of organics. The effect of the organic additive on activity (delta C3 vs C2) is much larger than the effect of the $SiO_2$ content (differences between C3, C4, C5 and C6). Apparently, the preparation method based on the use of organic additives removes the need of $SiO_2$ addition for the preparation of efficient $TiO_2/Al_2O_3$ based hydroprocessing catalysts.

It can be concluded that, in contrast to what is described in the prior art, using the preparation method disclosed in which organics are used in the preparation, the dispersion of the $TiO_2$ phase within the $TiO_2/Al_2O_3$ support does not have an obvious effect on catalyst activity. Likewise, the addition of $SiO_2$ to the catalyst composition does not result in a higher activity. Hence, the preparation method based on the use of organic additives as disclosed offers the advantage that allows greater flexibility in the design of a manufacturing process. For example, co-extrusion of Ti-precursors could be used, which would remove the need for cumbersome washing steps that are required when Ti is added during precipitation. Also a higher calcination temperature could be applied to obtain a certain required pore diameter without a negative effect of this procedure resulting in a decrease of the $TiO_2$ dispersion.

Examples D: The Effect of a Wide Variation of Organics Additives on the Activity of $TiO_2$/$Al_2O_3$Supported NiMo and CoMo Catalysts In the following examples it is illustrated that the use of different organic additives has a positive effect on the catalyst activity. A fixed $TiO_2/Al_2O_3$ support with a variation in the organic additive and comparable metal loading catalysts were prepared. The catalysts were tested in a multi-reactor unit under medium pressure hydrotreating of a SRGO. Table 8 shows the pre-sulfidation and test conditions that were used for testing and Tables 9 (NiMo) and 10 (CoMo) shows the activity results that were obtained.

TABLE 8

Pre-sulfiding and test (medium P ULSD) format used for activity testing of NiMo and CoMo catalysts from examples D.

Pre-sulfiding conditions

| Feed | LHSV (1/hr) | P (bar) | $H_2$/oil (Nl/l) | Temperature (° C.) | Time (hours) |
|---|---|---|---|---|---|
| Spiked LGO | 3 | 45 | 300 | 320 | 24 |

Testing conditions

| Feed | P (bar) | $H_2$/oil (Nl/l) | Temperature (° C.) | Time @ condition (days) |
|---|---|---|---|---|
| SRGO with 1.09 wt. % S and 200 ppmN | 45 | 300 | 350 | 4 |

Example D1: Comparative D1

Comparative D1 was prepared using support Sand impregnated with NiMoP aqueous solution without organics. An amount of aqueous NiMoP solution equivalent to fill 105% of the pore volume was used for impregnation, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The composition of the metal impregnated dried catalyst (dry base) was 22.1 wt. % $MoO_3$ and 3.6 wt. % NiO, 3.8 wt. % $P_2O_5$, 0.38 wt. % $SiO_2$, 15.0 wt. % $TiO_2$ and the rest is $Al_2O_3$.

Example D2: Invention D2

Invention D2 was prepared using Comparative D1 and a subsequent impregnation with Glyoxilic acid to reach 15 wt. % in the final catalyst. The composition of the metal impregnated dried catalyst (dry base) was as D1.

Example D3: Invention D3

Invention D3 was prepared using Comparative D1 and a subsequent impregnation with Resorcinol to reach 15 wt. % in the final catalyst. The composition of the metal impregnated dried catalyst (dry base) was as D1.

Example D4: Invention D4

Invention D4 was prepared using Comparative D1 and a subsequent impregnation with Triethylene glycol to reach 15 wt. % in the final catalyst. The composition of the metal impregnated dried catalyst (dry base) was as D1.

Example D5: Comparative D5

Comparative D5 was prepared in the same way as Comparative D1. The composition of the metal impregnated dried catalyst (dry base) was 23.6 wt. % $MoO_3$ and 4.1 wt. % NiO, 4.1 wt. % $P_2O_5$, 0.39 wt. % $SiO_2$, 14.4 wt. % $TiO_2$ and the rest is $Al_2O_3$.

Example D6: Invention D6

Invention D6 was prepared using Comparative D5 and a subsequent impregnation with Itaconic acid to reach 15 wt. % in the final catalyst. The composition of the metal impregnated dried catalyst (dry base) was as D5.

Example D7: Invention D7

Invention D6 was prepared using Comparative D5 and a subsequent impregnation with Diethylene Glycol Butyl Ether to reach 15 wt. % in the final catalyst. The composition of the metal impregnated dried catalyst (dry base) was as D5.

Example D8: Invention D8

Invention D8 was prepared using Comparative D5 and a subsequent impregnation with Glucose to reach 15 wt. % in the final catalyst. The composition of the metal impregnated dried catalyst (dry base) was as D5.

Example D9: Invention D9

Invention D9 was prepared using Comparative D5 and a subsequent impregnation with Ribose to reach 15 wt. % in the final catalyst. The composition of the metal impregnated dried catalyst (dry base) was as D5.

TABLE 9

The effect of the addition of an organic in combination with $TiO_2$-containing support in the activity of NiMo catalysts in medium P ULSD activity testing.

| Example | Support | Additive | $g_{CAT}$ db Reactor | mg $MoO_3$ Reactor | LHSV HDN | N (ppm) | RWA HDN r.o. 1 | LHSV HDS | S (ppm) | RWA HDS r.o. 1.2 |
|---|---|---|---|---|---|---|---|---|---|---|
| Comparative D1 | S10 | No organic | 0.841 | 207 | 4.0 | 46 | 100% | 2.7 | 61 | 100% |
| Invention D2 | | Glyoxilic acid | 0.857 | 211 | | 27 | 129% | | 26 | 125% |
| Invention D3 | | Resorcinol | 0.830 | 204 | | 22 | 149% | | 27 | 130% |
| Invention D4 | | Triethylene glycol | 0.847 | 208 | | 19 | 150% | | 50 | 104% |
| Invention D6 | | Itaconic acid | 0.886 | 233 | | 14 | 161% | 3.0 | 44 | 133% |

TABLE 9-continued

The effect of the addition of an organic in combination with TiO$_2$-containing support in the activity of NiMo catalysts in medium P ULSD activity testing.

| Example | Support | Additive | $g_{CAT}$ db Reactor | mg MoO$_3$ Reactor | LHSV HDN | N (ppm) | RWA HDN r.o. 1 | LHSV HDS | S (ppm) | RWA HDS r.o. 1.2 |
|---|---|---|---|---|---|---|---|---|---|---|
| Invention D7 | | DiethyleneGlycol Butyl Ether | 0.873 | 219 | | 11 | 178% | | 28 | 156% |
| Invention D8 | | Glucose | 0.907 | 238 | | 2 | 257% | | 21 | 158% |
| Invention D9 | | Ribose | 0.918 | 230 | | 3 | 256% | | 21 | 165% |

As can be observed in Table 9, there is a difference in catalyst intake, and MoO$_3$ loading in the reactor between the set of catalysts D1-D4 (based in D1) and D6-D9 (based on D5). To be able to compare the activity of the different catalysts, it was decided to determine catalyst activities on a wt-basis and compare the relative weight based activity (RWA) of all catalysts to Comparative D1. It becomes quite clear that the addition of a wide variety of different organic additives to NiMo catalysts based on a TiO$_2$—Al$_2$O$_3$(S10) support increases significantly the HDN and HDS activity of these catalysts.

Example D10: Comparative D10

Comparative D10 was prepared using support S10 and impregnated with CoMoP aqueous solution without organics. The CoMoP solution was prepared by dispersing of the required amount of CoCO$_3$ in water. The solution was then heated to 60° C. while stirring. Half of the required H$_3$PO$_4$ was added carefully to the solution and subsequently MoO$_3$ was added in small portions. The solution was heated up to 92° C. to obtain a clear solution. Finally, the rest of the H$_3$PO$_4$ was added to the solution and water was added to reach the concentration required for the desired metal loading. After impregnation, the extrudates were allowed to age for 1 hour in a closed vessel, after which drying was carried out at 120° C. for at least one hour. The composition of the metal impregnated dried catalyst (dry base) was 22.2 wt. % MoO$_3$ and 3.8 wt. % CoO, 3.9 wt. % P$_2$O$_5$, 0.37 wt. % SiO$_2$, 15.0 wt. % TiO$_2$ and the rest is Al$_2$O$_3$.

Example D11: Invention D11

Invention D11 was prepared using Comparative D10 and a subsequent impregnation with Glucose to reach 15 wt. % in the final catalyst. The composition of the metal impregnated dried catalyst (dry base) was as D10.

Example D12: Invention D12

Invention D12 was prepared using Comparative D10 and a subsequent impregnation with 3-hydroxybutyric acid to reach 15 wt. % in the final catalyst. The composition of the metal impregnated dried catalyst (dry base) was as D10.

Example D13: Invention D13

Invention D13 was prepared using Comparative D10 and a subsequent impregnation with Ribose to reach 15 wt. % in the final catalyst. The composition of the metal impregnated dried catalyst (dry base) was as D10.

Example D14: Invention D14

Invention D14 was prepared using Comparative D10 and a subsequent impregnation with Triethylene glycol to reach 15 wt. % in the final catalyst. The composition of the metal impregnated dried catalyst (dry base) was as D10.

Example D15: Invention D15

Invention D15 was prepared using Comparative D10 and a subsequent impregnation with 1,2-propanediol to reach 15 wt. % in the final catalyst. The composition of the metal impregnated dried catalyst (dry base) was as D10.

TABLE 10

The effect of the addition of an organic in combination with TiO$_2$-containing support in the activity of CoMo catalysts in medium P ULSD activity testing.

| Example | Support | Additive | $g_{CAT}$ db Reactor | mg MoO$_3$ Reactor | LHSV HDN | N (ppm) | RVA HDN r.o. 1 | LHSV HDS | S (ppm) | RVA HDS r.o. 1.2 |
|---|---|---|---|---|---|---|---|---|---|---|
| Comparative D10 | S10 | No organic | 0.845 | 209 | 4.0 | 66 | 100% | 2.7 | 105 | 100% |
| Invention D11 | | Glucose | 0.848 | 209 | | 46 | 129% | | 48 | 128% |
| Invention D12 | | 3-hydroxybutyric acid | 0.842 | 208 | | 50 | 129% | | 54 | 127% |
| Invention D13 | | Ribose | 0.847 | 209 | | 49 | 128% | | 57 | 124% |
| Invention D14 | | Triethylene glycol | 0.853 | 211 | | 53 | 116% | | 54 | 122% |
| Invention D15 | | 1,2-propanediol | 0.853 | 211 | | 56 | 113% | | 66 | 116% |

As observed in Table 10, the addition of an organic additive (wide variation) on CoMo catalysts based on a TiO$_2$—Al$_2$O$_3$(S10) support increases significantly the HDN and HDS activity of these catalysts. Activity of all catalysts has been related to Comparative Don a relative volumetric activity (RVA) basis, as in this case all catalysts were based on the same intermediate catalyst (D10) and catalyst intake and MoO$_3$ loading per reactor were almost identical for all catalysts.

Examples E: Synergistic Effect of the Use of Organics Additives in Combination with Ti—Al$_2$O$_3$ Supports on the Activity of NiMo Catalysts In the following examples, it is illustrated that the use of a TiO$_2$/Al$_2$O$_3$ support in combination with organic additives results in a synergetic effect. The activity benefit of applying a TiO$_2$/Al$_2$O$_3$ support in combination with organics is higher than can be expected based on the separate contributions of the (i) TiO$_2$/Al$_2$O$_3$ support and (ii) the organics as determined in separate experiments and can therefore be regarded as surprising. The catalysts presented are NiMo grades with comparable metal loadings and are based on the same TiO$_2$—Al$_2$O$_3$ support and the Al$_2$O$_3$ counterpart. The catalysts were tested in a multi-reactor unit under medium pressure ultra-low sulfur diesel conditions. Table 11 shows the experimental settings for the pre-sulfidation and test conditions and Tables 12, 13 and 14 shows the amount of catalyst that was loaded in the different reactors and the activity results.

TABLE 11

Pre-sulfiding and test (medium P ULSD) format used for activity testing of NiMo catalysts from example E.

| Pre-sulfiding conditions | | | | | |
|---|---|---|---|---|---|
| Feed | LHSV (1/hr) | P (bar) | H$_2$/oil (Nl/l) | Temperature (° C.) | Time (hours) |
| Spiked LGO | 3 | 45 | 300 | 320 | 24 |

| Testing conditions | | | | |
|---|---|---|---|---|
| Feed | P (bar) | H$_2$/oil (Nl/l) | Temperature (° C.) | Time @ condition (days) |
| SRGO with 1.09 wt. % S and 200 ppmN | 45 | 300 | 350 | 4 |

Example E1: Comparative E1

Comparative E1 was prepared using support S1 and impregnated with NiMoP aqueous solution without organics. An amount of aqueous NiMoP solution equivalent to fill 105% of the pore volume was used for impregnation, as is known for a person skilled in the art. The pore volume of the support was determined by a so-called water PV measurement in which the point of incipient wetness was determined by addition of water to the carrier extrudates. The NiMoP solution was prepared by dispersing of the required amount of NiCO$_3$ in water. The solution was then heated to 60° C. while stirring. Half of the required H$_3$PO$_4$ was added carefully to the solution and subsequently MoO$_3$ was added in small portions. The solution was heated up to 92° C. to obtain a clear solution. Finally, the rest of the H$_3$PO$_4$ was added to the solution and water was added to reach the concentration required for the desired metal loading. After impregnation, the extrudates were allowed to age for 1 hour in a closed vessel, after which drying was carried out at 120° C. for at least one hour. The composition of the metal impregnated dried catalyst (dry base) was 23.8 wt. % MoO$_3$ and 4.5 wt. % NiO, 4.1 wt. % P$_2$O$_5$ and the rest is Al$_2$O$_3$.

Example E2: Comparative E2

Comparative E2 was prepared using S10 and the same impregnation method as E1. The composition of the metal impregnated dried catalyst (dry base) was 21.3 wt. % MoO$_3$ and 4.0 wt. % NiO, 3.6 wt. % P$_2$O$_5$, 0.48 wt. % SiO$_2$, 15.3 wt. % TiO$_2$ and the rest is Al$_2$O$_3$.

Example E3: Comparative E3

Comparative E3 was prepared using S1 and the same impregnation procedure as E1, but with the addition of Gluconic acid with 0.42 mol/mol Mo in the metal impregnation solution. The composition of the metal impregnated dried catalyst (dry base) based on theoretical loading was 24.1 wt. % MoO$_3$ and 4.0 wt. % NiO, 4.0 wt. % P$_2$O$_5$ and the rest is Al$_2$O$_3$.

Example E4: Invention E4

Invention E4 was prepared using S10 and impregnated as E3. The composition of the metal impregnated dried catalyst (dry base) based on theoretical loading was 21.0 wt. % MoO$_3$ and 3.5 wt. % NiO, 3.5 wt. % P$_2$O$_5$, 0.42 wt. % SiO$_2$, 15.3 wt. % TiO$_2$ and the rest is Al$_2$O$_3$.

TABLE 12

The effect of the addition of gluconic acid in combination with TiO$_2$-containing support in the activity of NiMo catalysts in medium P ULSD activity testing.

| Example | Support | Additive | g$_{CAT}$ db Reactor | mg MoO$_3$ Reactor | LHSV HDN | N (ppm) | RVA HDN r.o. 1 | LHSV HDS | S (ppm) | RVA HDS r.o. 1.2 |
|---|---|---|---|---|---|---|---|---|---|---|
| Comparative E1 | S1 | No organic | 0.746 | 200 | 4.0 | 76 | 100% | 3.0 | 280 | 100% |
| Comparative E2 | S10 | No organic | 0.876 | 204 | | 41 | 154% | | 120 | 134% |
| Comparative E3 | S1 | Gluconic Acid | 0.744 | 199 | | 61 | 131% | | 224 | 117% |
| Invention E4 | S10 | Gluconic Acid | 0.880 | 205 | | 15 | 241% | | 47 | 179% |
| S$_{xy}$ | | | | | | | 56 | | | 28 |

As can be observed in Table 12, the activity of catalyst of the Invention E4 is larger than could be expected based on the added benefits of Ti-containing support (E2 without gluconic acid) and the use of gluconic acid as organic additive (E3 without Ti-support). To our surprise, the combination of a Ti-containing support and the use of gluconic acid as organic additive (Invention E4) show greater activity improvement than individual effects of support (E2) or organic (E3) relative to Comparative E1.

To determine the extent of the synergy between the effect of (i) TiO$_2$ addition to the support and (ii) addition of S-containing organics on catalyst activity, we determined Synergy factor Sxy as defined in Equation 1. RVA$_{0,0}$ is the relative activity of the reference catalyst (without Ti (x) or organics (y)) Values for ax and by were determined from the RVA of the comparative catalyst that is based on the $Al_2O_3$ support with the same organics ($RVA_{x,0}=RVA_{0,0}+ax$) and the RVA of the comparative catalyst based on the $TiO_2$—$Al_2O_3$ support without organics ($RVA_{0,y}=RVA_{0,0}+by$). A positive value of Sxy signifies that the activity of catalysts of the invention is higher than could be expected based on the individual contributions of the support and the organics on catalyst activity.

$$RVA_{x,y}=RVA_{0,0}+ax+by+Sxy \quad [Eq. 1]$$

Example E5: Comparative E5

Comparative E5 was prepared using support S1 and impregnated with NiMoP aqueous solution without organics. An amount of aqueous NiMoP solution equivalent to fill 105% of the pore volume was used for impregnation, as is known for a person skilled in the art. The pore volume of the support was determined by a so-called water PV measurement in which the point of incipient wetness was determined by addition of water to the carrier extrudates. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Finally, the rest of the $H_3PO_4$ was added to the solution and water was added to reach the concentration required for the desired metal loading. After impregnation, the extrudates were allowed to age for 1 hour in a closed vessel, after which drying was carried out at 120° C. for at least one hour. The composition of the metal impregnated dried catalyst (dry base) was 24.8 wt. % $MoO_3$ and 4.4 wt. % NiO, 4.3 wt. % $P_2O_5$ and the rest is $Al_2O_3$.

Example E6: Comparative E6

Comparative E6 was prepared using S10 and the same impregnation method as E5. The composition of the metal impregnated dried catalyst (dry base) was 22.0 wt. % $MoO_3$ and 3.8 wt. % NiO, 3.8 wt. % $P_2O_5$, 0.37 wt. % $SiO_2$, 15.0 wt. % $TiO_2$ and the rest is $Al_2O_3$.

Example E7: Comparative E7

Comparative E7 was prepared using S1 and impregnated as E5. Then a subsequent impregnation was performed with 1,2-propanediol to reach 15 wt. % in the final catalyst. The composition of the metal impregnated dried catalyst (dry base) was 25.9 wt. % $MoO_3$ and 4.3 wt. % NiO, 4.4 wt. % $P_2O_5$ and the rest is $Al_2O_3$.

Example E8: Invention E8

Invention E8 was prepared using S10 and impregnated as E5. Then a subsequent impregnation was performed with 1,2-propanediol to reach 15 wt. % in the final catalyst. The composition of the metal impregnated dried catalyst (dry base) was 23.6 wt. % $MoO_3$ and 4.1 wt. % NiO, 4.1 wt. % $P_2O_5$, 0.39 wt. % $SiO_2$, 14.4 wt. % $TiO_2$ and the rest is $Al_2O_3$.

TABLE 13

The effect of the addition of an organic in combination with $TiO_2$-containing support in the activity of NiMo catalysts in medium P ULSD activity testing.

| Example | Support | Additive | $g_{CAT}$ db Reactor | mg $MoO_3$ Reactor | LHSV HDN | N (ppm) | RVA HDN r.o. 1 |
|---|---|---|---|---|---|---|---|
| Comparative E1 | S1 | No organic | 0.746 | 200 | 4.0 | 76 | 100% |
| Comparative E5 | S1 | No organic | 0.715 | 197 |  | 76 | 100% |
| Comparative E2 | S10 | No organic | 0.876 | 204 |  | 41 | 154% |
| Comparative E6 | S10 | No organic | 0.854 | 209 |  | 47 | 146% |
| Comparative E7 | S1 | 1,2-propanediol | 0.709 | 204 |  | 51 | 135% |
| Invention E8 | S10 | 1,2-propanediol | 0.876 | 230 |  | 7 | 307% |
| $S_{xy}$ |  |  |  |  |  |  | 122 |

As can be observed in Table 13, the activity of Invention E8 is larger than what can be expected based on the individual benefits of Ti-containing support (E2 and E6 without organic) and the use of 1,2-propanediol as organic additive (E7 without Ti-support). To our surprise, the combination of Ti-containing support and the use of 1,2-propanediol as organic additive (Invention E8) show greater activity improvement than individual effects of support (E2 and E6) or organic (E7), resulting in a very significant synergy factor ($S_{xy}$). Since data from different tests have been used, RVA HDN is calculated according to a different reference: E2 and E8 are relative to Comparative E1, while E6 and E7 are relative to Comparative E5.

Example E9: Comparative E9

Comparative E9 was prepared using S1 and impregnated as E5. Then a subsequent impregnation was performed with 3-hydroxybutyric acid to reach 15 wt. % in the final catalyst. The composition of the metal impregnated dried catalyst (dry base) was as E5.

Example E10: Invention E10

Invention E10 was prepared using S10 and impregnated as E9. The composition of the metal impregnated dried catalyst (dry base) was 23.6 wt. % $MoO_3$ and 4.1 wt. % NiO, 4.1 wt. % $P_2O_5$, 0.39 wt. % $SiO_2$, 14.4 wt. % $TiO_2$ and the rest is $Al_2O_3$.

TABLE 14

The effect of the addition of an organic in combination with $TiO_2$-containing support in the activity of NiMo catalysts in medium P ULSD activity testing.

| Example | Support | Additive | $g_{CAT}$ db Reactor | mg $MoO_3$ Reactor | LHSV HDN | N (ppm) | RVA HDN r.o. 1 |
|---|---|---|---|---|---|---|---|
| Comparative E1 | S1 | No organic | 0.746 | 200 | 40 | 76 | 100% |
| Comparative E5 | S1 | No organic | 0.715 | 197 | | 76 | 100% |
| Comparative E2 | S10 | No organic | 0.876 | 204 | | 41 | 154% |
| Comparative E6 | S10 | No organic | 0.854 | 209 | | 47 | 146% |
| Comparative E9 | S1 | 3-hydroxybutiric acid | 0.731 | 211 | | 49 | 144% |
| Invention E10 | S10 | 3-hydroxybutiric acid | 0.898 | 236 | | 6 | 334% |
| | $S_{xy}$ | | | | | | 140 |

As can be observed in Table 14, the activity of Invention E10 is larger than the individual benefits of Ti-containing support (E2 and E6 without organic) and the use of 1,2-propanediol as organic additive (E9 without Ti-support). To our surprise, the combination of Ti-containing support and the use of 3-hydroxybutiric acid as organic additive (Invention E10) show greater activity improvement than individual effects of support (E2 and E6) or organic (E9). Since different LHSV have been used, RVA HDS is calculated according to a different reference: E2 and E10 are relative to Comparative E1, while E6 and E9 are relative to Comparative E5.

In ULSD applications, the removal of S to very low S-levels (<10 ppm) is the main objective. As a result, HDS-activity at high conversion is the most important activity parameter. However, it is well known that N-compounds inhibit the HDS reaction and removal of these molecules will greatly enhance the HDS reaction rate towards 10 ppm S. Moreover, HDS kinetics are highly complex and the reaction order is a function of conversion. HDN, on the other hand, is an apparent $1^{st}$ order reaction across a large conversion range. For these reasons, we have chosen to use HDN activity as the most activity to determine the synergetic effect.

Examples F: Effect of Co-Extruded Alumina Supports on the Activity of NiMo Catalysts for ULSD Applications The following examples illustrate the positive effect of $TiO_2$ addition in different ways as co-extruded supports on the activity of NiMo catalysts. The catalysts were prepared as described in examples F1-F3 using the same method to apply metals and organic additives to the catalysts and have a comparable volume loading of metals in the reactor. Approximately 0.9 ml of each of the catalysts was tested in a multi-reactor unit under medium pressure ultra-low sulfur diesel conditions. Table 15 shows the pre-sulfidation and test conditions and Table 16 shows the activity results.

TABLE 15

Pre-sulfiding and test (medium P ULSD) format used for activity testing of NiMo catalysts from examples F.

Pre-sulfiding conditions

| Feed | LHSV (1/hr) | P (bar) | $H_2$/oil (Nl/l) | Temperature (° C.) | Time (hours) |
|---|---|---|---|---|---|
| Spiked LGO | 3 | 45 | 300 | 320 | 24 |

Testing conditions

| Feed | P (bar) | $H_2$/oil (Nl/l) | Temperature (° C.) | Time @ condition (days) |
|---|---|---|---|---|
| SRGO with 1.1 wt. % S and 240 ppmN | 45 | 300 | 350 | 5 |

Example F1: Comparative F1

Comparative F1 was prepared using support Sand impregnated with NiMoP aqueous solution and diethylene glycol. The NiMoP solution was prepared by dispersing of the required amount of $NiCO_3$ in water. The solution was then heated to 60° C. while stirring. Half of the required $H_3PO_4$ was added carefully to the solution and subsequently $MoO_3$ was added in small portions. The solution was heated up to 92° C. to obtain a clear solution. Then, the rest of the $H_3PO_4$ was added to the solution and water was added to reach the concentration required for the desired metal loading. After cooling down, an amount of diethylene glycol to achieve 0.44 mol DEG per mol of metals (Mo+Ni) was added to the solution. An amount of the final solution equivalent to fill 105% of the pore volume was used for impregnation, as is known for a person skilled in the art. The pore volume of the support was determined by a so-called water PV measurement in which the point of incipient wetness was determined by addition of water to the carrier extrudates. After impregnation, the extrudates were allowed to age for 1 hour in a closed vessel, after which drying was carried out at 120° C. for at least one hour. The composition of the metal impregnated dried catalyst (dry base) was 22.8 wt. % $MoO_3$ and 3.9 wt. % NiO, 6.8 wt. % $P_2O_5$, 0.66 wt. % $SiO_2$ and the rest is $Al_2O_3$.

Example F2: Invention F2

Invention F2 was prepared using S15 and the same impregnation method as F1. The composition of the metal impregnated dried catalyst (dry base) was 22.7 wt. % $MoO_3$ and 3.8 wt. % NiO, 6.8 wt. % $P_2O_5$, 0.59 wt. % $SiO_2$, 7.1 wt. % $TiO_2$ and the rest is $Al_2O_3$.

Example F3: Invention F3

Invention F4 was prepared using S13 and the same impregnation method as F1. The composition of the metal impregnated dried catalyst (dry base) was 23.2 wt. % $MoO_3$ and 3.9 wt. % NiO, 6.9 wt. % $P_2O_5$, 0.35 wt. % $SiO_2$, 7.1 wt. % $TiO_2$ and the rest is $Al_2O_3$.

TABLE 16

The effect of the addition of an organic in combination with $TiO_2$-containing support in the activity of NiMo catalysts in medium P ULSD activity.

| Example | Support | $g_{CAT}$ db Reactor | mg $MoO_3$ Reactor | LHSV HDN | N (ppm) | RVA HDN r.o. 1 | LHSV HDS | S (ppm) | RVA HDS r.o. 1.2 |
|---|---|---|---|---|---|---|---|---|---|
| Comparative F1 | S14 | 0.847 | 193 | 4.0 | 28 | 100% | 2.5 | 35 | 100% |
| Invention F2 | S15 | 0.928 | 211 | | 14 | 132% | | 25 | 109% |
| Invention F3 | S13 | 0.795 | 185 | | 18 | 120% | | 24 | 111% |

As can be observed in Table 16, the catalysts with titania present in the support show higher activity than Comparative catalyst F1 without titania when using the same metal preparation procedure and similar metal loadings. The co-extruded titania and alumina support F2 shows very similar activity as the precipitated sample (F3) shown in previous examples when using diethylene glycol as organic additive.

Examples G: HC-PT Activity Data of NiMo Catalysts with Ribose as Organic Additive and $TiO_2$-Containing Supports The following examples illustrate the positive effect of $TiO_2$ addition in the support and Ribose as organic additive on the activity of NiMo catalysts in HC-PT application. The catalysts were prepared as described in examples G1-G4 using the same method to apply metals and organic additives to the catalysts and have a comparable volume loading of metals in the reactor. Approximately 0.9 ml of each of the catalysts was tested in a multi-reactor unit under medium pressure ultra-low sulfur diesel conditions. Table 17 shows the pre-sulfidation and test conditions and Table 18 shows the activity results.

TABLE 17

Pre-sulfiding and HC-PT test format used for activity testing of NiMo catalysts from examples G.

Pre-sulfiding conditions

| Feed | P (bar) | LHSV (1/hr) | $H_2$/oil (Nl/l) | Temperature (° C.) | Time (hours) |
|---|---|---|---|---|---|
| Spiked LGO | 45 | 3 | 300 | 320 | 24 |

Testing conditions

| Feed | P (bar) | LHSV (1/hr) | $H_2$/oil (Nl/l) | Temperature (° C.) | Time @ condition (days) |
|---|---|---|---|---|---|
| VGO with 2.1 wt. % S and 1760 ppmN | 120 | 1.7 | 1000 | 380 | 3 |

Example G1: Comparative G1

Comparative G1 was a commercial NiMo catalyst with no titania in the support and no Ribose additive.

Example G2: Invention G2

Comparative G1 was prepared using support S16 and impregnated with NiMoP aqueous solution without organics. After that, 0.44 mol Ribose/mol Metals were dissolved in water and impregnated in the previous sample allowed to age for 2 hours. The final catalyst was dried in a static oven at 100° C. overnight. The composition of the metal impregnated dried catalyst (dry base) was 27.7 wt. % $MoO_3$ and 5.0 wt. % NiO, 4.2 wt. % $P_2O_5$, 0.37 wt. % $SiO_2$, 3.5 wt. % $TiO_2$ and the rest is $Al_2O_3$.

Example G3: Invention G3

Invention G3 was prepared using S17 and the same impregnation method as G2. The composition of the metal impregnated dried catalyst (dry base) was 27.9 wt. % $MoO_3$ and 5.1 wt. % NiO, 4.2 wt. % $P_2O_5$, 0.39 wt. % $SiO_2$, 6.8 wt. % $TiO_2$ and the rest is $Al_2O_3$.

Example G4: Invention G4

Invention G4 was prepared using S18 and the same impregnation method as G2. The composition of the metal impregnated dried catalyst (dry base) was 26.0 wt. % $MoO_3$ and 4.4 wt. % NiO, 3.9 wt. % $P_2O_5$, 0.40 wt. % $SiO_2$, 13.6 wt. % $TiO_2$ and the rest is $Al_2O_3$.

TABLE 18

The NiMo catalysts activity in HC-PT testing for $TiO_2$ supported Ribose/NiMo catalysts from examples G (vs a commercial NiMo catalyst).

| Example | Support | $g_{CAT}$ db Reactor | mg $MoO_3$ Reactor | N (ppm) | RVA HDN r.o. 1 | S (ppm) | RVA HDS r.o. 1.2 |
|---|---|---|---|---|---|---|---|
| Comparative G1 | NiMo commercial catalyst | 0.748 | 232 | 72 | 100% | 198 | 100% |
| Invention G2 | S16 | 0.896 | 266 | 55 | 109% | 153 | 109% |
| Invention G3 | S17 | 0.886 | 265 | 27 | 131% | 94 | 127% |
| Invention G4 | S18 | 0.899 | 257 | 29 | 129% | 103 | 123% |

As can be observed in Table 16, the Invention examples with Ti-addition in the catalyst support (G2-G4) show significantly higher performance than the Comparative G1 (no titania) example. It is clear that the samples with 10 and 20 wt. % $TiO_2$ are better than the sample with 5 wt. % $TiO_2$ at similar metal loading.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A method of producing a catalyst, the method comprising precipitating a titanium source with an aluminum source, extruding the precipitate to form a titanium-containing carrier extrudate, drying and calcining the extrudate, and impregnating the calcined extrudate with an organic additive, at least one Group VIB metal source and/or at least one Group VIII metal source, the amount of the titanium source being sufficient so as to form a catalyst composition at least having a titanium content in the range of about 1 to about 60 wt. %, expressed as an oxide ($TiO_2$) based on the total weight of the catalyst and has less than 1.0 wt. % silica expressed as an oxide ($SiO_2$) and based on the total weight of the catalyst; wherein the precipitation comprises the steps of (a) simultaneous dosing of sodium aluminate and aluminum sulfate to water at a fixed pH (b) re-slurrying the formed alumina filter cake in water (c) adding to this slurry $TiOSO_4$ or titanium sulfate at a fixed pH>7 controlled by an alkaline solution.

2. A method of producing a catalyst, the method comprising precipitating a titanium source with an aluminum source, extruding the precipitate to form a titanium-containing carrier extrudate, drying and calcining the extrudate, and impregnating the calcined extrudate with an organic additive, at least one Group VIB metal source and/or at least one Group VIII metal source, the amount of the titanium source being sufficient so as to form a catalyst composition at least having a titanium content in the range of about 1 to about 60 wt. %, expressed as an oxide ($TiO_2$) based on the total weight of the catalyst and has less than 1.0 wt. % silica expressed as an oxide ($SiO_2$) and based on the total weight of the catalyst; wherein the aluminum source and the titanium source are mixed in one stream and sodium aluminate are dosed either simultaneously or subsequently to water at a pH>7.

3. The method of claim 1 or 2 wherein the organic additive is an organic compound selected from the group consisting of organic compounds comprising at least two oxygen atoms and 2-10 carbon atoms, and the ethers, esters, acetals, acid chlorides, acid amides, oligomers or polymers thereof and the impregnation is performed in a single step with a solution comprising an organic additive, at least one Group VIB metal source and/or at least one Group VIII metal source.

4. The method of claim 1 or 2 wherein the organic additive is an organic compound selected from the group consisting of organic compounds comprising at least two oxygen atoms and 2-10 carbon atoms, and the ethers, esters, acetals, acid chlorides, acid amides, oligomers or polymers thereof and the impregnation is performed in more than one step, wherein the carrier is impregnated with a solution comprising at least one Group VIB metal source and/or at least one Group VIII metal source, followed by a step of impregnating the carrier with a solution comprising an organic additive.

5. The method of claim 1 or 2 further comprising the titanium source being selected from the group consisting of titanyl sulfate, titanium sulfate, titanium alkoxide, or Titanium(IV)bis(ammonium lactato)dihydroxide.

\* \* \* \* \*